United States Patent [19]

Rousseau

[11] Patent Number: 4,860,606
[45] Date of Patent: Aug. 29, 1989

[54] RATCHET APPARATUS WITH HAND TRUCK ASSEMBLY

[75] Inventor: Kenneth E. Rousseau, Wichita, Kans.

[73] Assignee: Harper Truck, Inc., Wichita, Kans.

[21] Appl. No.: 197,669

[22] Filed: May 23, 1988

[51] Int. Cl.[4] .................. F16D 41/16; B60P 7/08; B62B 1/06
[52] U.S. Cl. .................... 74/157; 24/68 R; 188/82.2; 192/12 B; 192/43.1; 280/47.27; 410/100
[58] Field of Search ............ 74/157, 142; 81/61, 81/62; 410/100; 280/47.27; 24/68 R, 68 CD; 188/82.2; 192/43.1, 12 B

[56] References Cited

U.S. PATENT DOCUMENTS

| | | | |
|---|---|---|---|
| 13,393 | 8/1855 | Jackson | 74/157 X |
| 578,855 | 3/1897 | Bradley | 410/100 |
| 691,061 | 1/1902 | Kollock et al. | 74/157 X |
| 1,023,972 | 4/1912 | Starnes | 192/43.1 X |
| 1,680,515 | 8/1928 | Gormley | 74/157 X |
| 2,165,603 | 7/1939 | Yeats | 280/47.27 X |
| 2,289,137 | 7/1942 | Matter | 74/157 |
| 2,673,632 | 3/1954 | Stiranka | 74/157 X |
| 2,775,463 | 12/1956 | Chenette | 280/47.37 R X |
| 2,838,190 | 6/1958 | Stevens | 280/47.27 X |
| 3,051,338 | 8/1962 | Safford | 414/448 |
| 3,181,380 | 5/1965 | Pellen et al. | 74/157 X |
| 3,299,725 | 1/1967 | Gewirc et al. | 74/157 |
| 3,372,612 | 3/1968 | Rozmus | 81/62 |
| 3,467,231 | 9/1969 | Haznar | 192/43.1 |
| 4,154,122 | 5/1979 | Severin | 74/142 |
| 4,277,989 | 7/1981 | Tracy | 192/43.1 X |

FOREIGN PATENT DOCUMENTS 364 of 1908 United Kingdom .......... 74/157

Primary Examiner—Allan D. Herrmann
Attorney, Agent, or Firm—Phillip A. Rein

[57] ABSTRACT

This invention relates to a ratchet apparatus adapted to be connected to a hand truck assembly in order to control movement of an article connector assembly about an article to be conveyed. The ratchet apparatus includes a ratchet housing assembly; a ratchet handle assembly connected to the ratchet housing assembly; and a ratchet actuator assembly mounted between the ratchet handle assembly and the ratchet housing assembly. The ratchet handle assembly includes a main handle assembly operable in a reciprocal rotational movement to achieve positive, controlled movement of a connector belt member. The ratchet actuator assembly includes a main actuator assembly having a ratchet dog assembly and a ratchet pawl assembly operably connected to a ratchet drive assembly. The ratchet dog assembly and the ratchet pawl assembly are operably engageable with the ratchet drive assembly to achieve positive increment rotational movement of a ratchet gear member in opposite directions under rotational movement of the ratchet handle assembly while preventing rotational movement of the ratchet gear member in the opposite direction to prevent release thereof. The ratchet dog assembly and the ratchet pawl assembly are operable to be reversed so as to provide positive movement in either direction and prevent movement in the opposite direction.

4 Claims, 5 Drawing Sheets

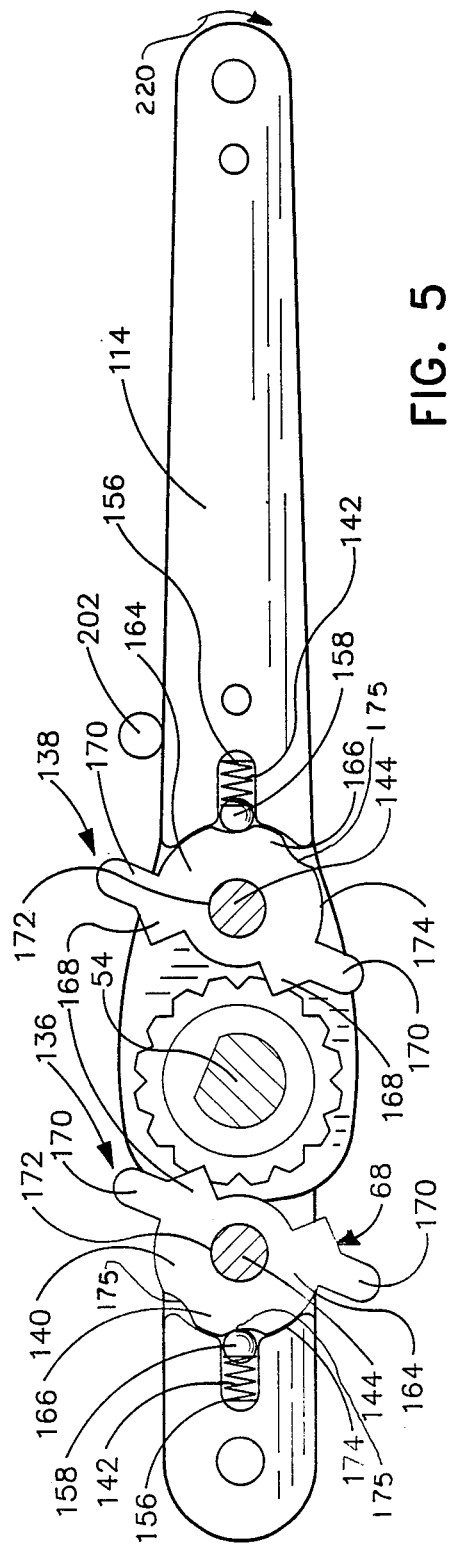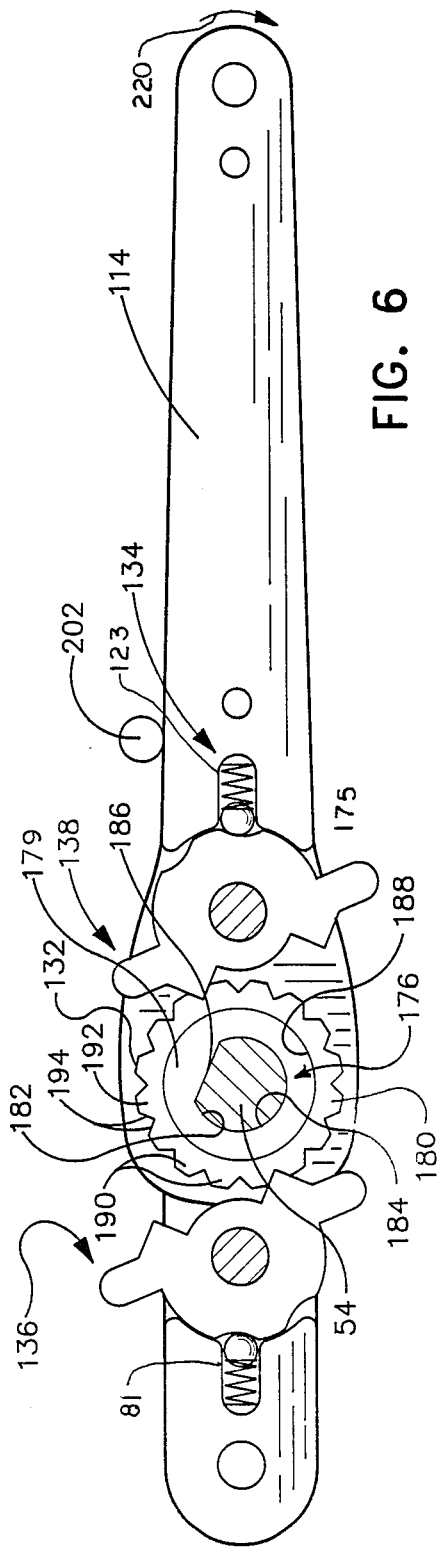

RATCHET APPARATUS WITH HAND TRUCK ASSEMBLY

PRIOR ART

A patent search on the above invention revealed the following United States patents:

| U.S. Pat. No. | Invention | Inventor |
| --- | --- | --- |
| 2,165,603 | HAND TRUCK | Thomas W. Yeats |
| 2,775,463 | APPLIANCE HAND TRUCK | Joseph C. Chenette |
| 2,838,190 | HAND TRUCK | William P. Stevens |
| 3,051,338 | HAND TRUCK ASSEMBLY | Thomas W. Safford |
| 3,372,612 | PAWL TYPE RATCHET WRENCH | Matt T. Rozmus |
| 3,467,231 | PAWL REVERSING MECHANISM | Henry J. Haznar |

The Safford patent discloses a conventional hand truck assembly using an offset cam structure to tighten a strap member about an item to be carried thereon.

The Yeats patent discloses a basic combination of a hand truck having a ratchet assembly to tighten a strap about an item to be carried. The ratchet structure provides for one-way tightening movement with a pawl member.

The Stevens and Chenette patents disclose appliance hand trucks having ratchet mechanisms operable in positive tightening movement in one direction.

The Haznar patent discloses a pawl reversing mechanism for ratchet wrenches utilizing a spring and ball for holding pawl members in a drive position. This structure is not utilized to be positively driven and locked during movement in selected opposite directions.

The Rozmus patent discloses a conventional pawl type ratchet wrench using pivotal pawl members biased by abuttment and spring members to various drive positions. In this structure, only one pawl member at a time is used to rotate the driven structure such as a socket member in opposite directions. This device does not illustrate or teach our positive movement and locking features in opposite directions.

PREFERRED EMBODIMENT OF THE INVENTION

In one preferred embodiment of the invention is a ratchet apparatus with hand truck assembly which includes a hand truck assembly with a ratchet apparatus connected thereto. The ratchet apparatus is operably connected to an article connector assembly usable in a conventional manner having a connector belt member to be placed about and connected to an appliance to be elevated and moved such as a refrigerator or the like. The ratchet apparatus includes (1) a ratchet housing assembly; (2) a ratchet handle assembly connected to the ratchet housing assembly; and (3) a ratchet actuator assembly mounted on the ratchet handle assembly and operably associated with the ratchet housing assembly to selectively and positively tighten and loosen the connector belt member. The ratchet housing assembly provides a main support housing and a top connector housing mounted on an upper support plate on a truck frame assembly of the hand truck assembly. The ratchet handle assembly includes a main handle assembly having a main handle body which is pivotally connected to the ratchet housing assembly for reciprocal ratchet movements. The ratchet actuator assembly includes a main actuator assembly connected to the ratchet handle assembly and the ratchet housing assembly; a ratchet drive assembly having a ratchet gear member connected to a belt connector shaft which, in turn, is connected to the connector belt member for tightening and releasing same; and a bias and stop assembly connected between the main handle assembly and the ratchet housing assembly to provide for (a) return movement of the main handle assembly after a ratchet movement; and (b) a stop post member to limit movement of the main handle assembly in one direction. The main actuator assembly is provided with a ratchet dog assembly and a ratchet pawl assembly operable similar to one-way ratchet assemblies and selectively movable to positively rotate the ratchet gear member and interconnected belt connector shaft for positive movement and restrained movement in both directions of rotation.

OBJECTS OF THE INVENTION

One object of this invention is to provide a new and novel ratchet apparatus which can be connected to new or existing hand truck assemblies and operably connected to an appliance connector belt member so as to provide a means of positively tightening and loosening the belt member in both directions.

Another object of this invention is to provide a ratchet apparatus with hand truck assembly having a ratchet apparatus connected to a hand truck assembly with the ratchet apparatus provided with a new and novel ratchet actuator assembly so as to provide for positive belt restrictive movement during both tightening and belt release operations.

Another object of this invention is to provide a ratchet apparatus with hand truck assembly with a ratchet assembly readily mountable on a support plate of the hand truck assembly and operably connected to a belt connector shaft to positively move same in a locked fashion in opposite directions for ease of usage and safety features.

Still, one other object of this invention is to provide a ratchet apparatus mountable on a hand truck assembly including a ratchet actuator assembly having a ratchet dog assembly and a ratchet pawl assembly which can be readily moved to cooperating first and second positions for tightening or loosening a belt member about an appliance member or the like.

One further object of this invention is to provide a ratchet apparatus mounted on a new or existing hand truck assembly which is economical to manufacture; easy to operate; reliable in operation; maintenance free; and sturdy in construction.

A further object of this invention is to provide a ratchet apparatus operable to rotate a shaft member positively in opposite directions and concurrently preventing rotation of the shaft member in a direction opposite the direction being positively driven.

Various other objects, advantages, and features of the invention will become apparent to those skilled in the art from the following discussion, taken in conjunction with the accompanied drawings, in which;

FIGURES OF THE INVENTION

FIGS. 5 and 6 are top plan schematic views illustrating positioning of the ratchet actuator assembly of this invention to illustrate conditions for the positive movement actuation thereof.

Figure 1:
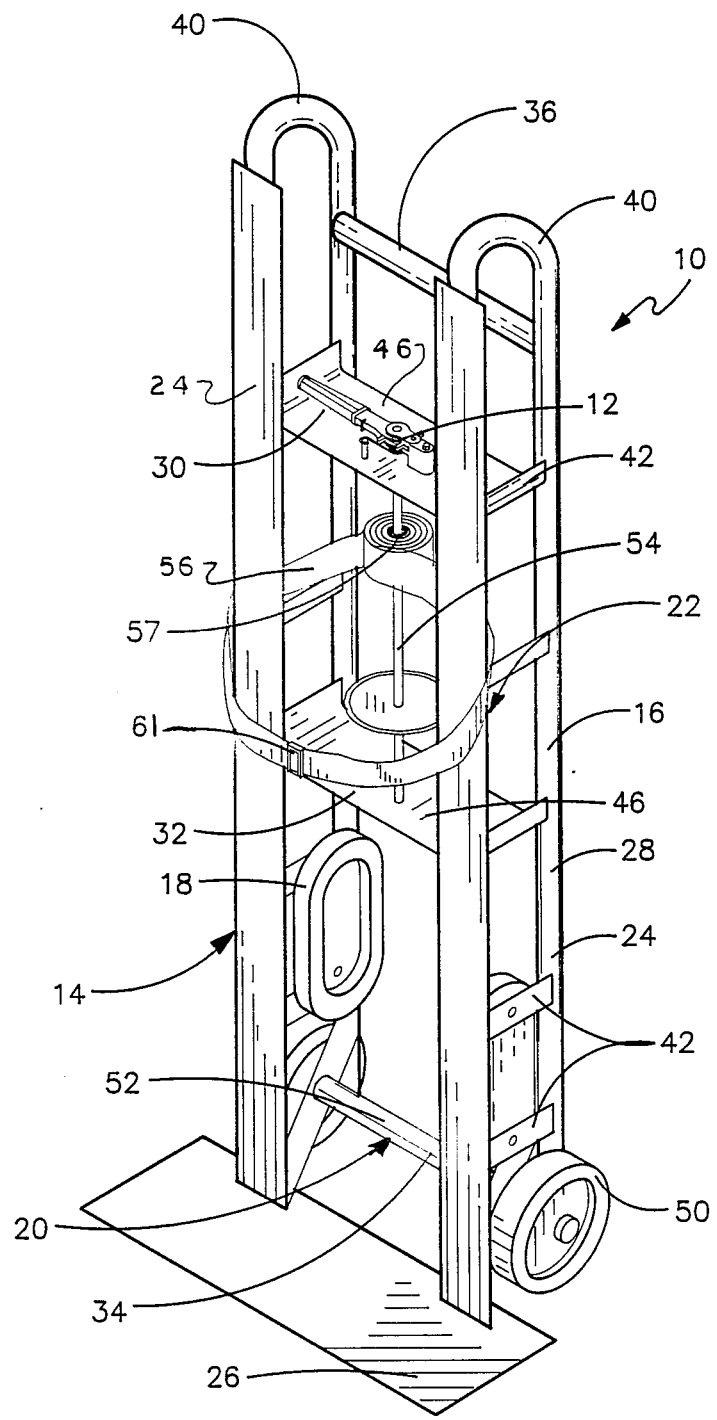
FIG. 1 is a perspective view of the ratchet apparatus with hand truck assembly of this invention.

The following is a discussion and description of a preferred specific embodiment of the new ratchet apparatus with hand truck assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 1, a ratchet apparatus with hand truck assembly of this invention, indicated generally at 10, includes a hand truck assembly 14 having a ratchet apparatus 12 of this invention connected thereto. The hand truck assembly 14 is a conventional appliance hand truck structure including (1) a hand truck frame assembly 16; (2) a stair climber assembly 18 connected to a lower portion of the hand truck frame assembly 16; (3) a wheel assembly 20 operable to provide vertical support to the hand truck frame assembly 16 for movement on a support surface; and (4) an article connector assembly 22 engagable with the appliance or other article to be conveyed by the hand truck assembly 14.

The hand truck frame assembly 16 includes a pair of parallel side rail members 24 interconnected at a lower end thereof by a nose plate member 26. The side rail members 24 are each provided with U-shaped rail sections 28 interconnected by upper and lower support plates 30, 32 and support tube members 34, 36.

The U-shaped rail sections 28 are each provided with an upper handle portion 40 integral with parallel support members 42.

The upper and lower support plates 30, 32 are each provided with parallel support surfaces 46.

The wheel assembly 20 includes a pair of upright parallel spaced support wheel members 50 interconnected with each other by a support shaft 52 which, in turn, is mounted with the support tube 43 and between portions of the opposed U-shaped side rail sections 28 to provide the necessary strength and vertical support for operation of the hand truck assembly 14 in a conventional manner.

As noted in FIG. 1, the article connector assembly 22 is provided with (1) an upright belt connector shaft 54; (2) a connector belt member 56 operably mounted about the belt connector shaft 54; and (3) a belt receiving pulley 57 which receives the connector belt member 56 thereabout for receiving and releasing same therefrom.

The belt connector shaft 54 is provided with connector lugs at the opposite ends thereof for connecting to the ratchet apparatus 12 and, additionally, rotatably connected to the support plates 30, 32 in a manner to be explained. The connector belt member 56 is provided with a belt buckle assembly 61 connected to releasable adjacent ends. The belt buckle assembly 61 can be of numerous different types with the connector belt member 56 operable in rotation of the belt connector shaft 54 to either tighten or release the belt member 56 from the belt receiving pulley 57 as noted by the mounting thereof in FIG. 1.

The belt receiving pulley 57 includes a set screw 60 operable to anchor same to the belt connector shaft 54 for rotation therewith by the ratchet apparatus 12 as will be explained.

The ratchet assembly 12 includes (1) a ratchet housing assembly 64 which is anchored to the upper support plate 30 in a generally central location; (2) a ratchet handle assembly 66 which is operably connected to the ratchet housing assembly 64; and (3) a ratchet actuator assembly 68 operably connected between the ratchet housing assembly 64 and the ratchet handle assembly 66.

Figure 2A:
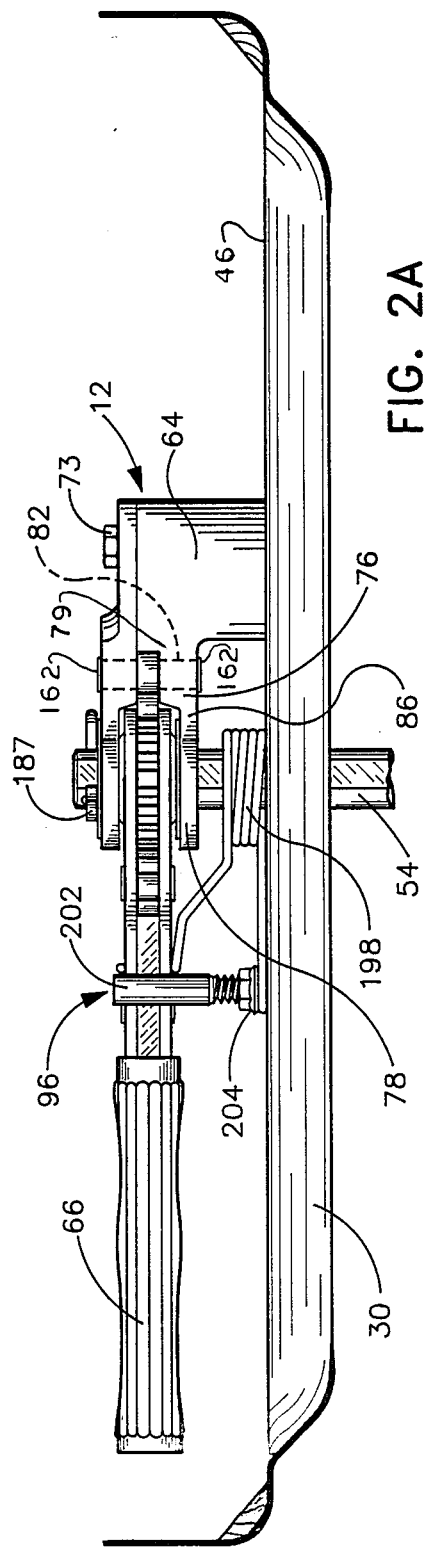
FIG. 2A is a side elevational view of a ratchet apparatus of this invention as mounted on an upper support plate of a hand truck assembly.
Figure 2B:
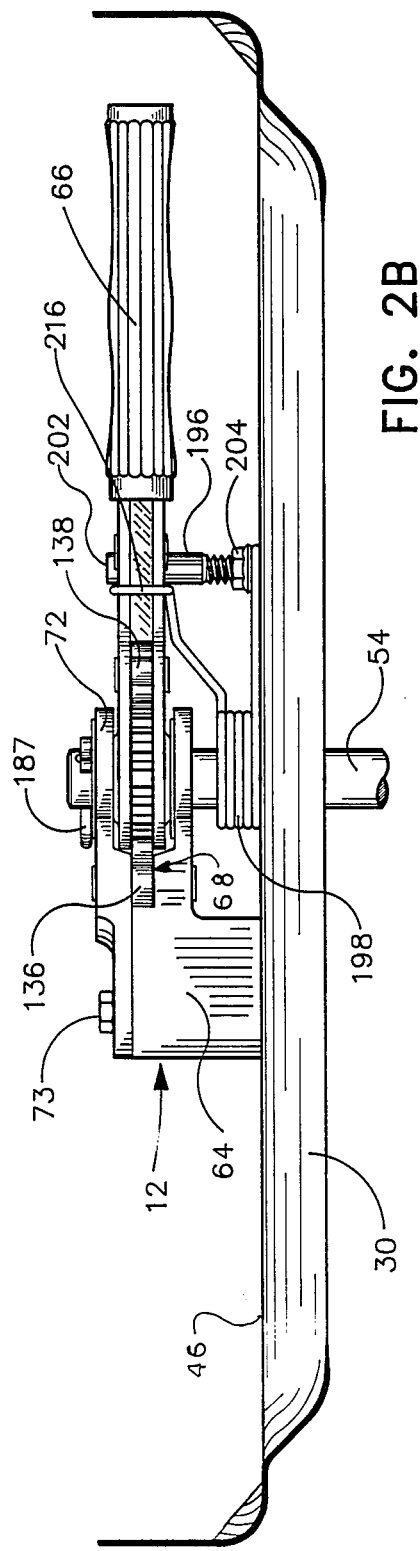
FIG. 2B is a side elevational view similar to FIG. 2A showing the side opposite thereof.

As noted in FIG. 2A and 2B, the ratchet housing assembly 64 includes a main support housing 70 having a top connector housing 72 mounted thereon, both of which are interconnected to the upper support plate 30 by an anchor bolt assembly 73. The anchor bolt assembly 73 consists of a conventional nut and bolt member for anchoring to the upper support plate 30.

The main support housing 70 includes a lug section 74 integral with a dog section 76 which, in turn, is integral with a shaft support section 78.

The lug section 74 is provided with a connector hole 80 adapted to receive the anchor bolt assembly 73 therethrough and a slot 81. The dog section 76 is provided with a stepped section 79 and a dog support hole 82 therethrough.

The shaft support section 78 includes a stepped shaft section 86 integral with a circular main body 88 having a shaft support hole 90 therethrough.

The top connector housing 72 includes a lug anchor section 92 integral with a dog anchor section 94 which, in turn, is integral with a shaft anchor section 96.

The dog anchor section 94 is provided with a stepped portion 102 having a dog support hole 104 therethrough. The dog support hole 104 is aligned with the dog support hole 82 in the dog section 76 for interconnecting as will be explained.

The shaft anchor section 96 is provided with a step shaft portion 106 with an outer circular body portion 108 and having a shaft support hole 110 therethrough. The shaft support hole 110 is aligned with the shaft support hole 90 to receive the belt connector shaft 54 therethrough.

The ratchet handle assembly 66 includes a main handle assembly 112 consisting of a main handle body 114 having a handle grip member 116 thereon.

The main handle body 114 includes upper and lower plate member 118, 120 placed on either side of a spacer plate member 122. The spacer plate member 122 is provided with a slot 123 similar to the slot 81 for reasons to be explained.

The upper and lower plate members 118, 120 are provided with outer arculate end sections 126 having aligned ratchet openings 124 therein.

The handle grip member 116 is provided with an outer rib section 128 constructed of a rubber or non-slip material.

The ratchet actuator assembly 68 includes (1) a main actuator assembly 130; (2) a ratchet drive assembly 132 operably connected to the main actuator assembly 130; and (3) a bias and stop assembly 134 operable to control movement of the ratchet handle assembly 66 in a manner to be explained.

The main actuator assembly 130 includes a ratchet dog assembly 136 and a ratchet pawl assembly 138. The ratchet dog assembly 136 includes (1) a dog member 140 of irregular plate shape; (2) a bias assembly 142 engagable with the dog member 140 for controlled movement thereof; and (3) a connector shaft 144.

The dog member 140 includes a main body 164; a detent section 166; actuator protrusions 168; and actuator lugs 170. The main body 164 is provided with a connector hole 172 and a radial section 174.

The detent section 166 includes a pair of adjacent detent arculate portions 175 to selectively receive a portion of the bias assembly 142 therein to hold the dog member 140 in a selected operational position.

The bias assembly 142 includes a spring member 56 operable to bias a ball member 158 from its position within the slot 81 to bias the ball member 158 into contact with the detent arculate portions 175 when used in selected positions of the dog member 140.

The connector shaft 144 includes outer end sections 162 which can be welded or riveted to the adjacent portions of the ratchet housing assembly 64 in the interconnected condition as noted in FIG. 2A.

The ratchet pawl assembly 138 includes (1) a pawl member 172; (2) a bias assembly 142; and (3) a connector shaft 144. It is noted that the elements of the pawl member 172 are identical to that previously described for the dog member 140 and, therefore, further explanation is not deemed necessary.

The ratchet drive assembly 132 includes a ratchet gear member 176 mounted about the upper end portion of the connector shaft 54 and having a pair of spacer members 178 mounted on both sides of the ratchet gear member 176.

The ratchet gear member 176 includes a central connector member 179 having a gear tooth assembly 180 mounted about the outer periphery of the central connector member 179.

The central connector member 179 is provided with a shaft connector opening 182 with a flat section 186. The belt connector shaft 54 is connected by a lock pin 187 in a position adjacent the uppermost of the spacer members 178 as viewed in FIG. 2A.

The gear tooth assembly 180 is provided with a central connector opening 188 and having about an outer periphery a plurality of gear tooth members 190. Each gear tooth member 190 is provided with a pyramid section 192 having inclined actuator walls 194.

Figure 3:
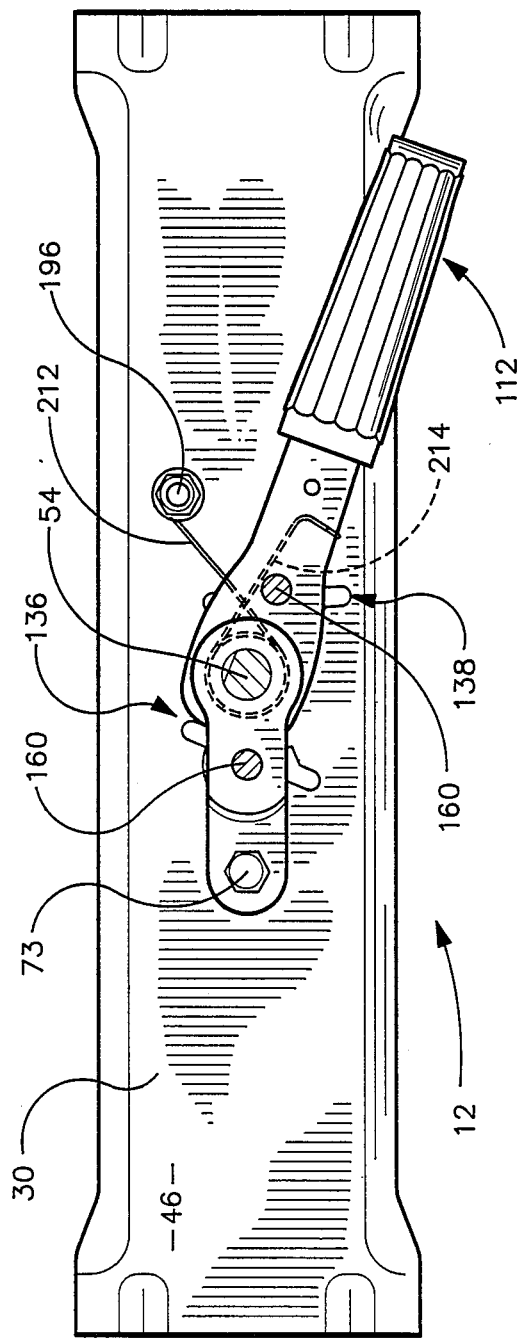
FIG. 3 is a top plan view of the side elevational view of FIG. 2A illustrating a main handle assembly in a partially actuated condition.
Figure 4:
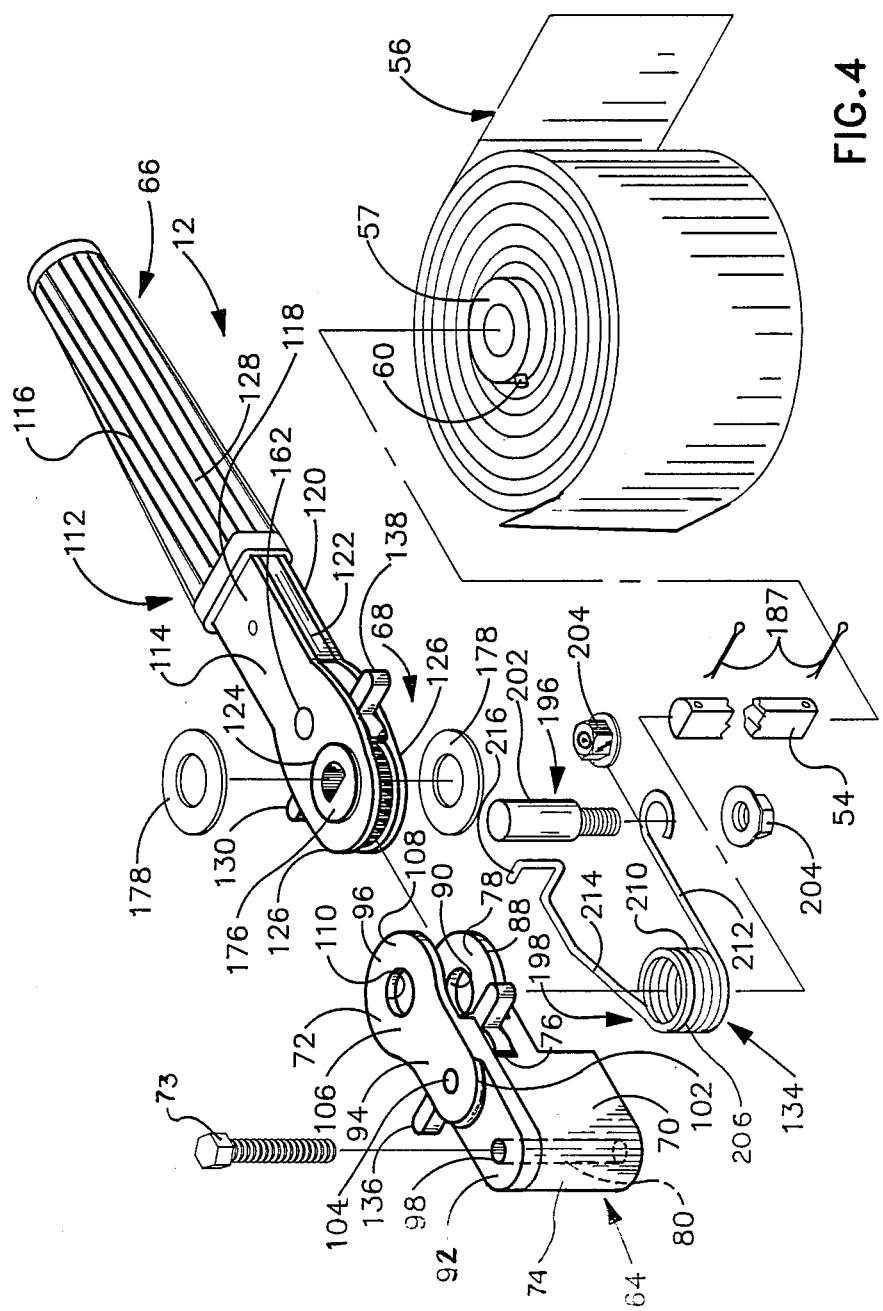
FIG. 4 is an exploded perspective view of the ratchet apparatus of this invention illustrated as connected to a connector belt member.

The bias and stop assembly 134 includes a stop post assembly 196 having a recoil spring assembly 198 operably associated therewith. The stop post assembly 196 includes a stop post member 202 which is secured by lock nuts 204 to the upper support plate 30 through a hole therein in a position as noted in FIG. 3. The stop post member 202 operates to as a stop for rotational movement in a counter clockwise direction of the main handle assembly 112 (FIG. 3).

The recoil spring assembly 198 includes a spring member 206 having a main spring body 210; an integral stationary leg member 212; and a movable leg membeer 214. The movable leg member 214 has a hook section 216 which is engagable with a portion of the main handle body 114 of the main handle assembly 112 to bias same in a counter clockwise direction as shown in FIG. 3.

USE AND OPERATION OF THE INVENTION

In the use and operation of the ratchet apparatus with hand truck assembly 10 of this invention, it is noted that the ratchet apparatus 12 is secured to the upper support plate 30 of the hand truck assembly 14 as noted in FIG. 1. The ratchet apparatus 12 is operable to achieve positive rotation of the belt connector shaft 54 and interconnected belt receiving pulley 57 having the connector belt member 56 thereon for controlled tightening and loosening operations. The connector belt member 56 is readily placed about an item to be moved and having outer ends thereof selectively interconnected as by the belt buckle assembly 61 or other similar locking structure.

Next, the ratchet dog assembly 136 and the ratchet pawl assembly 138 are pivotal to a position so as to extend with actuator lugs 170 in spaced parallel planes as noted in FIG. 5. Thereupon, on pivotal movement of the main handle assembly 112 as shown by an arrow 220 in FIG. 5, this causes positive ratchet movement through the pawl member 172 to achieve a tightening of the connector belt member 56 by clockwise rotation of the belt connector shaft 54. Concurrently, the dog member 140 is biased against the bias assembly 142 associated therewith and then moved into engagement of the actuator protrusions 168 with the inclined actuator walls 194 of the gear tooth assembly 180.

It is seen that in the movement of FIG. 5, the ratchet pawl assembly 139 operates to tighten the connector belt member 56 while the ratchet dog assembly 136 prevents rotation of the ratchet gear member 176 in an opposite or counter clockwise direction. This prevents undesired movement of the ratchet gear member 176 and the belt connector shaft 54 in the opposite direction due to tension present on tightening of the connector belt member 56. This achieves a positive tightening force movement in one direction by the ratchet pawl assembly 138 and the ratchet dog assembly 136 maintains the tightening force and prevents rotation in the other direction due to tension on the connector shaft 54.

After moving an article on the hand truck assembly 14 to a desired location, it is noted that a first step is to loosen the connector belt member 56 as, due to the tightened condition, it is difficult to disconnect the belt buckle assembly 61 without relieving pressure and tension on subject connector belt member 56.

To achieve the positive loosening of the belt member 56, the operator would grasp the main handle assembly 112 and move the same slightly to achieve pivotal clockwise movement of the pawl assembly 138 and the connector shaft 54 thereby relieving tension on the dog assembly 136. While holding this tension, the operator would move the dog assembly 136 to another inclined position as shown in FIG. 6. Then, the operator would release the main handle assembly 112 which will move under bias of the recoil spring assembly 198 to a position against the stop post member 202. The operator will then move the ratchet pawl assembly 138 to another inclined position as shown in FIG. 6.

Next, as noted in FIG. 6, main handle assembly 112 is moved in a counter clockwise direction and the ratchet pawl assembly 138 contacts the ratchet gear member 176 to rotate same and the connector shaft 54 in a counter clockwise direction to relieve tension on the connector belt member 56 and permit movement of the ratchet dog assembly 136 to the position shown in FIG. 6 in which the actuator lugs 170 are directed in parallel planes.

With the ratchet dog assembly 136 and the ratchet pawl assembly 138 in the positions shown in FIG. 6, the connector shaft 54 is free to rotate in a counter clockwise direction on pulling of the connector belt member 56.

After relieving the tension on the connector belt member 56 with this positive movement, it is then obvious that the belt buckle assembly 61 can be disconnected from the article being conveyed on the hand truck assembly 14.

The ratchet apparatus 12 provides for a positive rotation of the connector shaft 54 by the ratchet pawl assembly 138 in either direction with the ratchet dog assembly 136 concurrently preventing rotation in an opposite direction. This is achieved by the offset nature and relationship of the actuator protrusions 168; the connector shaft 144; the belt connector shaft 54; and the gear tooth assembly 180.

More specifically, the design of the ratchet gear member 176 and the gear tooth assembly 180 with the pyramid sections 192 and inclined actuator walls 194 are operable with the actuator protrusions 168 to provide for the new and novel retaining and locking feature of the ratchet apparatus 12 of this invention.

The ratchet apparatus of this invention can be mounted on new or existing hand truck assemblies and connected to an article connector assembly for attaching to an article to be moved in a new, novel, and unusual manner. The ratchet apparatus is easy to operate; sturdy in construction; economical to manufacture; and provides numerous safety features when dealing with an article connector assembly having tension forces to prevent injury to the operator.

While the invention has been described in conjunction with preferred specific embodiments thereof, it should be understood that this description is tended to illustrate and not to limit the scope of the invention, which is defined by the following claims:

I claim:

1. A ratchet apparatus mounted on a hand truck assembly adapted to rotate an article connector assembly having a connector belt member mounted on a connector shaft, comprising:
   (a) a ratchet housing assembly mounted on a support plate and having a connector shaft rotatably connected thereto;
   (b) a ratchet handle assembly mounted about said connector shaft and pivotal relative to said ratchet housing assembly;
   (c) a ratchet actuator assembly including a main actuator assembly and a ratchet drive assembly;
   (d) said main actuator assembly includes a ratchet dog assembly connected to said ratchet housing assembly and a ratchet pawl assembly connected to said ratchet handle assembly;
   (e) said ratchet drive assembly includes a ratchet gear member mounted on said connector shaft to positively drive same in opposite rotational directions;
   (f) said ratchet dog assembly and said ratchet pawl assembly are engagable with said ratchet gear member operable in one selected position to positively rotate said connector shaft in one direction and prevent rotation of said connector shaft in an opposite direction caused by tension on the connector belt member;
   (g) said ratchet pawl assembly includes a pawl member pivotally connected to said ratchet handle assembly and engagable with said ratchet gear member to achieve positive rotation of said connector shaft in either direction of rotation;
   (h) said ratchet pawl assembly includes a bias assembly engagable with said pawl member to bias same into engagement with said said ratchet gear member in either direction of rotation; and
   (i) said bias assembly of said ratchet pawl assembly includes a spring member mounted in said ratchet handle assembly engagable with a ball member which, in turn, is engagable with said pawl member to bias same into engagement with said ratchet gear member for positive drive of the connector shaft.

2. A ratchet apparatus mounted on a hand truck assembly adapted to rotate an article connector assembly having a connector belt member mounted on a connector shaft, comprising:
   (a) a ratchet housing assembly mounted on a support plate and having a connector shaft rotatably connected thereto;
   (b) a ratchet handle assembly mounted about said connector shaft and pivotal relative to said ratchet housing assembly;
   (c) a ratchet actuator assembly including a main actuator assembly and a ratchet drive assembly;
   (d) said main actuator assembly includes a ratchet dog assembly connected to said ratchet housing assembly and a ratchet pawl assembly connected to said ratchet handle assembly;
   (e) said ratchet drive assembly includes a ratchet gear member mounted on said connector shaft to positively drive same in opposite rotational directions;
   (f) said ratchet dog assembly and said ratchet pawl assembly are engagable with said ratchet gear member operable in one selected position to positively rotate said connector shaft in one direction and prevent rotation of said connector shaft in an opposite direction caused by tension on the connector belt member;
   (g) said ratchet dog assembly and said ratchet pawl assembly are engagable with said ratchet gear member in another selected position to rotate said connector shaft in an opposite direction and prevent rotation of said connector shaft in said one direction caused by tension on the connector belt member;
   (h) said ratchet dog assembly includes a dog member pivotally connected to said ratchet housing assembly and engagable with said ratchet gear member to prevent rotation of said connector shaft in either of said one direction or said opposite direction under tension from the connector belt member;
   (i) said ratchet pawl assembly includes a pawl member pivotally connected to said ratchet handle assembly and engagable with said ratchet gear member to achieve positive rotation of said connector shaft in either said one direction or said opposite direction of rotation;
   (j) said dog member and said pawl member in said one selected position and said another selected position being parallel to each other to positively drive said connector shaft in opposite rotational directions;
   (k) said pawl member pivotal in said one direction to relieve pressure against said dog member and said dog member can be moved from said one selected position to said another selected position; and (l) said pawl member moved to said another selected position parallel to said dog member whereby said connector shaft is freely rotatable in said opposite direction to unroll the connector belt member from said connector shaft.

3. A ratchet apparatus as described in claim 2, wherein:
   (a) said ratchet actuator assembly includes a bias and stop assembly connected to said support plate and said ratchet handle assembly;
   (b) said bias and stop assembly includes a stop post assembly secured to said support plate and a spring assembly anchored at one end to said ratchet housing assembly and engagable with said ratchet handle assembly to bias same into engagement with said stop post assembly; and
   (c) said spring assembly includes a recoil spring member mounted about said connector shaft having a stationary leg member anchored to said ratchet housing assembly and an integral movable leg member engagable with said ratchet handle assembly to bias same in said opposite direction toward abuttment with said stop post assembly and aligned with said ratchet housing assembly;
   whereby said ratchet handle assembly is pivotal in said one direction against the bias of said spring assembly and limited in pivotal movement in said opposite direction by contact with said stop post assembly.

4. A ratchet apparatus operable to selectively rotate an actuator shaft positively in opposite directions of rotation and prevent unintentional rotational movement of the actuator shaft in a direction opposite the positively driven direction, comprising:
   (a) a ratchet housing assembly having said actuator shaft rotatably connected thereto;
   (b) a ratchet handle assembly operably connected to said ratchet housing assembly and said actuator shaft for positive rotation thereof;
   (c) a ratchet actuator assembly including a main actuator assembly and a ratchet drive assembly;
   (d) said main actuator assembly includes a ratchet dog assembly connected to said ratchet housing assembly and a ratchet pawl assembly connected to said ratchet handle assembly;
   (e) said ratchet drive assembly includes a ratchet gear member mounted on said actuator shaft to be engagable with said ratchet dog assembly and said ratchet pawl assembly;
   (f) said ratchet handle assembly operable on pivotal movement in one position to positively engage said ratchet pawl assembly with said ratchet gear member to rotate said actuator shaft member in one rotational direction and operable in another position of said ratchet pawl assembly to positively drive said actuator shaft member in an opposite rotational direction;
   (g) said ratchet dog assembly is engagable with said ratchet gear member in said one position to prevent rotation of said actuator shaft due to a bias force thereon in said opposite rotational direction and operable in said another position to prevent rotation of said actuator shaft in said one rotational direction caused by tension on said actuator shaft;
   (h) said ratchet dog assembly and said ratchet pawl assembly are engagable with said ratchet gear member in said another position to rotate said actuator shaft in said opposite rotational direction and prevent rotation of said actuator shaft in said one rotational direction;
   (i) said ratchet dog assembly includes a bias assembly engagable with said dog member to bias same into engagement with said ratchet gear member in either of selected ones of said one position or said another position;
   (j) said bias assembly includes a spring member mounted in said ratchet housing assembly engagable with a ball member engagable with said dog member to bias same into said one position and said another position;
   (k) said ratchet pawl assembly includes a pawl member pivotally connected to said ratchet handle assembly and engagable with said ratchet gear member to rotate said actuator shaft in either of said one direction or said another direction;
   (l) said ratchet actuator assembly includes a bias and stop assembly having a bias assembly connected to said ratchet housing assembly and said ratchet handle assembly to bias same into one direction of rotation against a stop post assembly connected to said ratchet housing assembly;
   (m) said pawl member pivotal in said one direction to relieve pressure against said dog member and said dog member can be moved from said one selected position to said another selected position; and
   (n) said pawl member moved to said another selected position parallel to said dog member whereby said connector shaft is freely rotatable in said opposite direction to unroll the connector belt member from said connector shaft.

* * * * *